(12) United States Patent
Madison et al.

(10) Patent No.: US 12,394,083 B2
(45) Date of Patent: Aug. 19, 2025

(54) METHODS AND APPARATI FOR INTENSIFIED VISUAL-INERTIAL ODOMETRY

(71) Applicant: Thales Defense & Security, Inc., Clarksburg, MD (US)

(72) Inventors: Richard Madison, Bedford, MA (US); Olegs Mise, North Andover, MA (US); Brian Haight, Windham, NH (US); Robert Atac, Batavia, IL (US)

(73) Assignee: Thales Defense & Security, Inc., Clarksburg, MD (US)

( * ) Notice: Subject to any disclaimer, the term of this patent is extended or adjusted under 35 U.S.C. 154(b) by 453 days.

(21) Appl. No.: 17/935,383

(22) Filed: Sep. 26, 2022

(65) Prior Publication Data

US 2023/0094104 A1 Mar. 30, 2023

Related U.S. Application Data

(60) Provisional application No. 63/249,379, filed on Sep. 28, 2021.

(51) Int. Cl.
*G06T 7/70* (2017.01)
*A42B 3/04* (2006.01)
*G02B 5/20* (2006.01)
*H04N 23/63* (2023.01)
*H04N 23/67* (2023.01)
*H04N 23/80* (2023.01)

(52) U.S. Cl.
CPC .............. *G06T 7/70* (2017.01); *A42B 3/042* (2013.01); *H04N 23/67* (2023.01); *H04N 23/80* (2023.01); *G02B 5/20* (2013.01); *G06T 2207/30212* (2013.01); *G06T 2207/30244* (2013.01); *G06T 2207/30252* (2013.01); *H04N 23/63* (2023.01)

(58) Field of Classification Search
None
See application file for complete search history.

(56) References Cited

U.S. PATENT DOCUMENTS

| 8,773,537 | B2 | 7/2014 | O'Rourke |
| 11,054,629 | B1 * | 7/2021 | Sheydayi ............... G02B 23/10 |
| 2007/0237415 | A1 * | 10/2007 | Cao ...................... H04N 1/3871 |
| | | | 382/254 |

(Continued)

FOREIGN PATENT DOCUMENTS

| CN | 107230187 A | * | 10/2017 | ............. G06F 16/40 |
| CN | 108876745 A | * | 11/2018 | ............. G06T 5/003 |

(Continued)

*Primary Examiner* — Ricky Chin
(74) *Attorney, Agent, or Firm* — ArentFox Schiff LLP

(57) ABSTRACT

Aspects of the present disclosure include methods and systems for receiving a first image, amplifying a luminous intensity of the first image to generate a second image, digitally capturing the second image, identifying a first time associated with receiving the first image or capturing the second image, acquiring spatial information of the imaging system, identifying a second time associated with acquiring the spatial information, associating the second image with the spatial information based on the first time being substantially contemporaneous with the second time, and generating at least one of a position or an orientation of the imaging system based on the second image and the spatial information.

32 Claims, 4 Drawing Sheets

(56) References Cited

U.S. PATENT DOCUMENTS

| | | | | |
|---|---|---|---|---|
| 2012/0050536 | A1* | 3/2012 | Dobbie | G02B 7/28 |
| | | | | 359/811 |
| 2015/0243629 | A1* | 8/2015 | Herbots | H01L 24/83 |
| | | | | 438/455 |
| 2016/0037067 | A1* | 2/2016 | Lee | H04N 23/56 |
| | | | | 348/208.6 |
| 2017/0352190 | A1* | 12/2017 | Calloway | G01C 21/1656 |
| 2018/0160896 | A1* | 6/2018 | Nordstrom | A61B 3/022 |
| 2022/0020126 | A1* | 1/2022 | Zhen | G06T 5/92 |
| 2022/0101593 | A1* | 3/2022 | Rockel | G06F 3/017 |
| 2022/0164023 | A1* | 5/2022 | Nassar | G06F 3/012 |
| 2023/0047931 | A1* | 2/2023 | Borden | G02B 27/30 |
| 2023/0094104 | A1* | 3/2023 | Madison | G06T 7/70 |
| | | | | 348/158 |
| 2023/0179874 | A1* | 6/2023 | Madison | H04N 23/80 |
| | | | | 348/475 |
| 2024/0201490 | A1* | 6/2024 | Hamilton | G02B 17/026 |

FOREIGN PATENT DOCUMENTS

| | | | | | |
|---|---|---|---|---|---|
| CN | 109074680 | A | * | 12/2018 | G06K 9/00671 |
| CN | 112129287 | A | | 12/2020 | |
| CN | 112257729 | A | * | 1/2021 | A63F 13/52 |
| CN | 112288648 | A | * | 1/2021 | G06T 3/4007 |
| CN | 112969436 | A | * | 6/2021 | A61F 9/08 |
| CN | 114885096 | A | * | 8/2022 | H04N 23/667 |
| CN | 114998891 | A | | 9/2022 | |
| CN | 113781396 | B | * | 12/2023 | G06N 3/045 |
| WO | WO 2017/083420 | A1 | | 5/2017 | |
| WO | WO-2022021025 | A1 | * | 2/2022 | |

* cited by examiner

METHODS AND APPARATI FOR INTENSIFIED VISUAL-INERTIAL ODOMETRY

CROSS-REFERENCE TO RELATED APPLICATIONS

The current application claims priority to, and the benefit of U.S. Provisional Application No. 63/249,379 filed Sep. 28, 2021, and entitled "METHODS AND APPARATI FOR INTENSIFIED VISUAL-INERTIAL ODOMETRY," the contents of which are hereby incorporated by reference in their entirety.

BACKGROUND

In a low lighting environment, a person may utilize a conventional night vision device to see surroundings. A conventional night vision device may include light amplification mechanisms (such as intensifier tubes, photocathodes, photomultipliers) to amplify the images captured by the night vision device. Further, it may be desirable for the person to be provided with location information (e.g., position, orientation) based on the images captured by the night vision devices. However, conventional systems may require the illumination of surroundings, which is unacceptable in certain applications (e.g., military applications). Therefore, improvements may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods and systems for receiving a first image, amplifying a luminous intensity of the first image to generate a second image, digitally capturing the second image, acquiring, contemporaneously with receiving the first image or capturing the second image, spatial information of the imaging system, associating the second image with the spatial information based on a first time being substantially contemporaneous with a second time, and generating at least one of a position or an orientation of the imaging system based on the second image and the spatial information.

Aspects of the present disclosure include a night vision helmet including a first multiplier configured to receive a first image, and amplify a first luminous intensity of the first image to generate a second image, a first image sensor configured to digitally capture the second image, a second multiplier configured to: receive a third image, and amplify a second luminous intensity of the third image to generate a fourth image, a second image sensor configured to digitally capture the fourth image, an inertial measurement unit configured to acquire, contemporaneously with receiving the first image or capturing the second image, spatial information of the night vision helmet, a memory that stores instructions, a processor configured to execute the instructions to: associate the second image and the fourth image with the spatial information, and generate at least one of a position or an orientation of the night vision helmet based on the second image, the fourth image, and the spatial information, a display configured to display at least one of the second image, the fourth image, or the at least one of the position or the orientation of the night vision helmet.

Advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In some aspects of the present disclosure, an imaging system may be configured to operate in a low lighting environment (e.g., at night). The imaging system may receive a first image in the low lighting environment. The imaging system may amplify the luminous intensity of the first image using one or more of a photomultiplier (e.g., a photocathode) and/or a photodiode (e.g., an avalanche photodiode). The amplified image may be digitally captured by an image sensor (e.g., a charged coupled device (CCD) sensor or a complimentary metal-oxide-semiconductor (CMOS) sensor). The imaging system may include an inertial measurement unit (IMU) that measures the linear velocity, the linear acceleration, the angular velocity, the angular acceleration, and/or the change in the linear or angular acceleration of the imaging system, and/or the magnetic field near the imaging system.

In some aspects, the imaging system may identify a first time associated with the captured first image and/or the amplified image. The imaging system may identify a second time associated with the spatial information determined by the IMU. The imaging system may use the information above (e.g., images and IMU measurements) to determine one or more of the position, speed, direction, movements, angular rate, and/or orientation, of the imaging system and/or the IMU.

In an aspect of the present disclosure, the imaging system may be coupled to a helmet such that the wearer of the helmet is able to see the light enhanced images of objects in the low lighting environment via a display on the helmet. The wearer may also see, for example, augmented reality information, displayed to the wearer via the display on the helmet. The augmented reality information may be generated using the position, speed, direction, movements, and/or orientation determined based on the IMU information. For example, military personnel may wear a helmet including the imaging system in a combat environment at night. The imaging system may provide augmented reality information (generated based on the position, angular rate, and/or orientation information) such as landscape contours to assist the military personnel with navigation.

In another aspect, the imaging system may be deployed in a vehicle (for land, air, or water use). The operator of the vehicle may utilize the imaging system to see the light enhanced images of objects in the low lighting environment.

Figure 1:
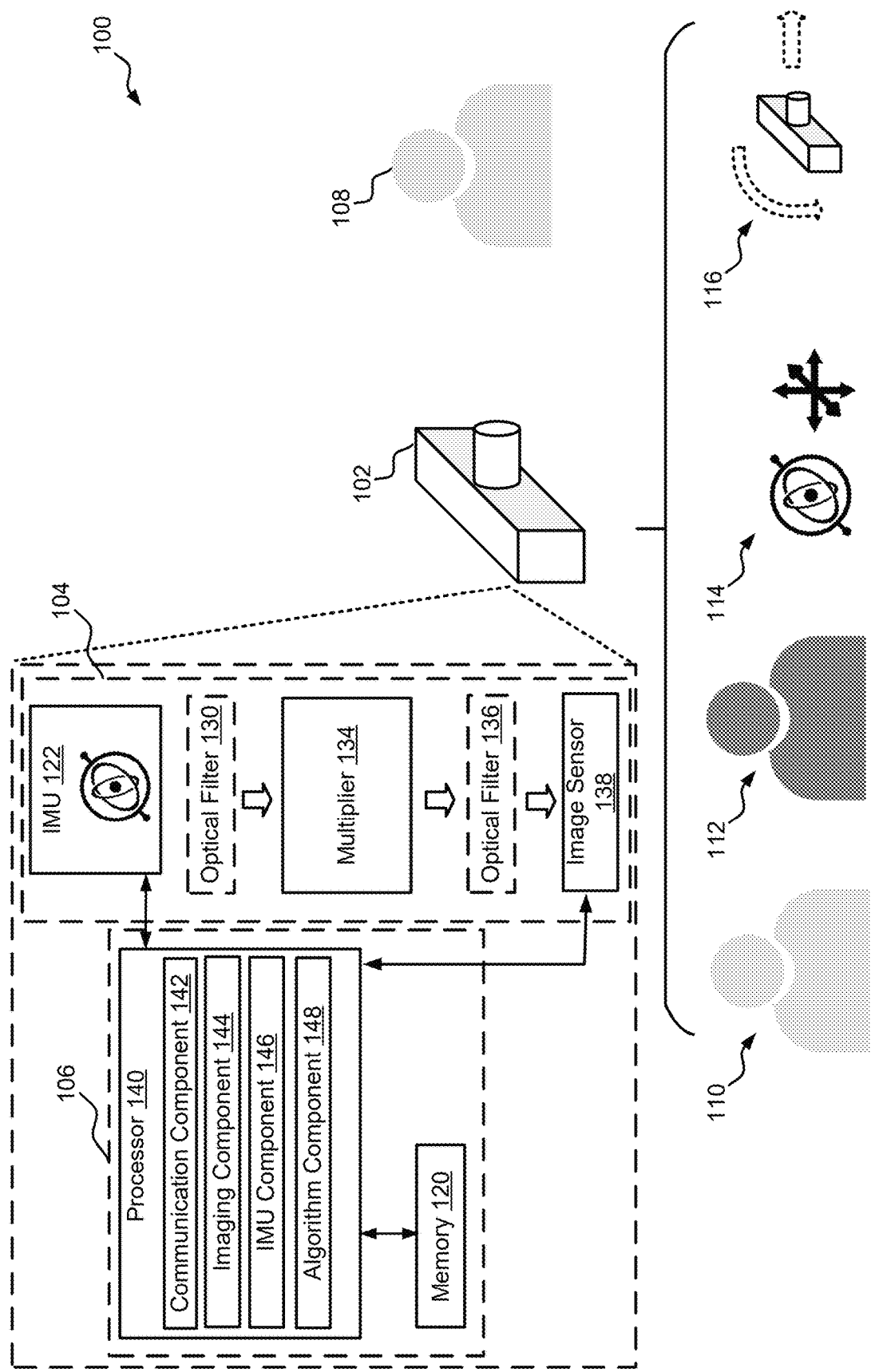
FIG. 1 illustrates an example of an environment for implementing intensified visual inertial odometry in accordance with aspects of the present disclosure.

Referring to FIG. 1, in a non-limiting implementation, an example of an environment 100 (e.g., a low lighting environment, such as outdoor during nighttime or indoor without artificial light) for visual inertial odometry is shown according to aspects of the present disclosure. The environment 100 may include an imaging system 102 having an imaging device 104 and/or a computing device 106. The computing device 106 may be physically disposed within the imaging system 102, or located remotely from the imaging system 102. The imaging system 102 may be configured to capture the image of an object 108 in the environment 100 under low lighting situations (e.g., less than 1 Candela/square meter (cd/m$^2$), 0.1 cd/m$^2$, 10$^{-3}$ cd/m$^2$, 10$^{-5}$ cd/m$^2$, or 10$^{-7}$ cd/m$^2$).

In certain aspects, the imaging device 104 may include an inertial measurement unit (IMU) 122 configured to obtain the spatial information associated with the imaging system 102. For example, the spatial information may include one or more of a linear velocity, an angular velocity, a linear acceleration, an angular acceleration, a magnetic field, or a magnetic dipole moment of the imaging system 102. The IMU 122 may include one or more accelerometers, gyroscopes, and/or magnetometers, for example.

In an aspect, the imaging device 104 may include a first optional optical filter 130 configured to filter incoming lights. The incoming lights may form one or more images. Examples of the first optical filter 130 may include a collimator, a decollimator, a low-pass filter, a band-pass filter, a high-pass filter, a neutral density filter, a polarizer, etc. The imaging device 104 may include a multiplier 134 configured to receive and/or amplify the luminous intensity of the incoming lights. In some examples, the multiplier 134 may be or include one or more of a photomultiplier, a photocathode, a scintillator, a dynode, an anode, a vacuum tube, etc. In other examples, the multiplier 134 may be a digital multiplier 134 including one or more of avalanche photodiodes, quantum well diodes, or other semiconductor-based devices. In some aspects, the multiplier 134 may amplify the luminous intensity of the incoming light to amplified light.

In some aspects of the present disclosure, the imaging device 104 may include a second optional optical filter 136. The second optical filter 136 may filter the amplified light. Examples of the second optional optical filter 136 may include a collimator, a decollimator, a low-pass filter, a band-pass filter, a high-pass filter, a neutral density filter, a polarizer, etc.

In certain aspects, the imaging device 104 may include an image sensor 138 configured to digitize images formed based on the amplified light to digital images. For example, the image sensor 138 may include a charged coupled device (CCD) sensor or a complimentary metal-oxide-semiconductor (CMOS) sensor.

Still referring to FIG. 1, in an aspect of the present disclosure, the computing device 106 may include a processor 140 that executes instructions stored in a memory 120 for performing the unlocking functions described herein.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor may include, for example, one or more microprocessors, controllers, digital signal processors (DSPs), field programmable gate arrays (FPGAs), programmable logic devices (PLDs), state machines, gated logic, discrete hardware circuits, and other suitable hardware configured to perform the various functionality described herein.

The term "memory," as used herein, may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some aspects, the computing device 106 may include the memory 120. The memory 120 may include software instructions and/or hardware instructions, for example. The processor 140 may execute the instructions to implement aspects of the present disclosure.

In certain aspects, the processor 140 may include a communication component 142 configured to communicate with external devices via one or more wired and/or wireless couplings. The processor 140 may include an imaging component 144 configured to capture images via the image sensor 138. The processor 140 may include an IMU component 146 configured to obtain the spatial information measured by the IMU 122. The processor 140 may include an algorithm component 148 configured, for example, to determine the position, orientation, and/or movement of the imaging system 102 and/or the imaging device 104.

For example, during operation, the imaging system 102 and/or the imaging device 104 may capture a first image 110 of the object 108 under a low lighting condition. The multiplier 134 may amplify the first image 110 to generate a second image 112. The second image 112 may be the "brightened" version of the first image 110. The image sensor 138 may digitally capture the second image 112. The imaging component 144 may append a first time stamp to the second image 112. The first time stamp may indicate a first time that the imaging device 104 captured the first image 110 and/or the imaging device 104 generated the second image 112.

In certain implementations, the imaging system 102 and/or the imaging device 104 may capture the first image 110 using devices having avalanche photodiodes, quantum well diodes, or other semiconductor devices. The devices may be configured to capture the first image 110, amplify the first image 110, and digitize the first image 110. Thus, the multiplier 134 and the image sensor 138 may be or include a single device (with or without the optional optical filters 130, 136).

In optional implementations, the first optical filter 130 may (if present and/or utilized) filter the light of the first image 110 prior to the multiplier 134 amplifying the first image 110. For example, the first optical filter 130 may collimate the light of the first image 110. Additionally or alternatively, the second optical filter 136 may (if present and/or utilized) filter the light of the second image 112 prior to the image sensor 138 digitally capturing the second image 112. For example, the second optical filter 136 may focus the light of the second image 112.

In certain aspects of the present disclosure, the IMU 122 may obtain spatial information 114 of the imaging device 104 and/or imaging system 102, such as linear velocity, angular velocity, linear acceleration, angular acceleration, presence or strength of magnetic field, or presence or strength magnetic dipole moment of the imaging device 104 and/or imaging system 102. The IMU 122 may utilize one or more accelerometers, gyroscopes, and/or magnetometers within the IMU 122 to perform the measurements associated with the spatial information 114. The IMU component 146 may append a second time stamp to the spatial information 114. The second time stamp may indicate a second time that the IMU 122 obtains the spatial information 114 of the imaging system 102 and/or the imaging device 104.

In one aspect of the present disclosure, the algorithm component 148 may identify the first time of the first image 110 or the second image 112 based on the first time stamp and the second time of the spatial information 114 based on the second time stamp. The algorithm component 148 may match the first image 110 or the second image 112 with the spatial information 114 based on the first time being approximately identical to the second time (e.g., within 1 microsecond, within 1 millisecond, within 1 second, etc., of each other). Thus, the imaging device 104 may capture the first image 110 or generate the second image 112 contemporaneously with obtaining the spatial information 114.

In an aspect of the present disclosure, the algorithm component 148 may implement one or more algorithms, such as visual odometry, visual-inertial odometry, and/or simultaneous localization and mapping (SLAM), to determine the position and/or the orientation 116 of the imaging system 102 and/or the imaging device 104. In optional aspects, the algorithm component 148 may generate a visual map of environment 100. For example, the algorithm component 148 may generate a visual map showing the contours of the landscape in the surrounding environment.

In certain implementations, the imaging system 102 may optionally include additional imaging devices, such as additional multipliers, optical filters, image sensors, and/or IMUs. The imaging system 102 may utilize data streams from the additional imaging devices to improve the accuracy of the position and/or the orientation 116 of the imaging system 102 and/or the imaging device 104.

In optional implementations, the imaging system 102 may include non-image sensors, such as acoustic sensors or magnetic sensors, configured to capture environmental parameters near the imaging system 102. The imaging system 102 may utilize data streams from the non-image sensors to improve the accuracy of the position and/or orientation 116 of the imaging system 102 and/or the imaging device 104.

In some instances, the algorithms such as visual odometry, visual-inertial odometry, and/or SLAM may receive visual inputs based on fiducial tracking (e.g., from fiducial marks) to determine the position and/or the orientation 116 of the imaging system 102 and/or the imaging device 104.

In one example, the imaging system 102 may include two optic-multiplier-optic-camera-IMU pipelines attached to a helmet configured to be worn by an operator (not shown in FIG. 1). The pipelines may each incorporate a mirror, for example, to bend the light so the pipelines do not protrude. Each pipeline circuitry may utilize a wireless network (e.g., new radio or fifth generation (5G)) to send the images and/or IMU spatial information to a computer (e.g., mounted to a body of the operator). The computer may execute the visual navigation algorithms using the images and/or the spatial information, and output the position and orientation of the two cameras. In some implementations, the pipelines may also provide the images to displays of a head mounted display on the helmet, allowing the operator to essentially virtually see in the dark. The computer may use the position and orientation of the cameras to infer the position and/or orientation of the displays. The computer may render augmented and/or mixed reality onto the displays. For example, the computer may superimpose outlines of buildings, landscapes, and/or objects to assist the operator in seeing the environment at night.

Figure 2:
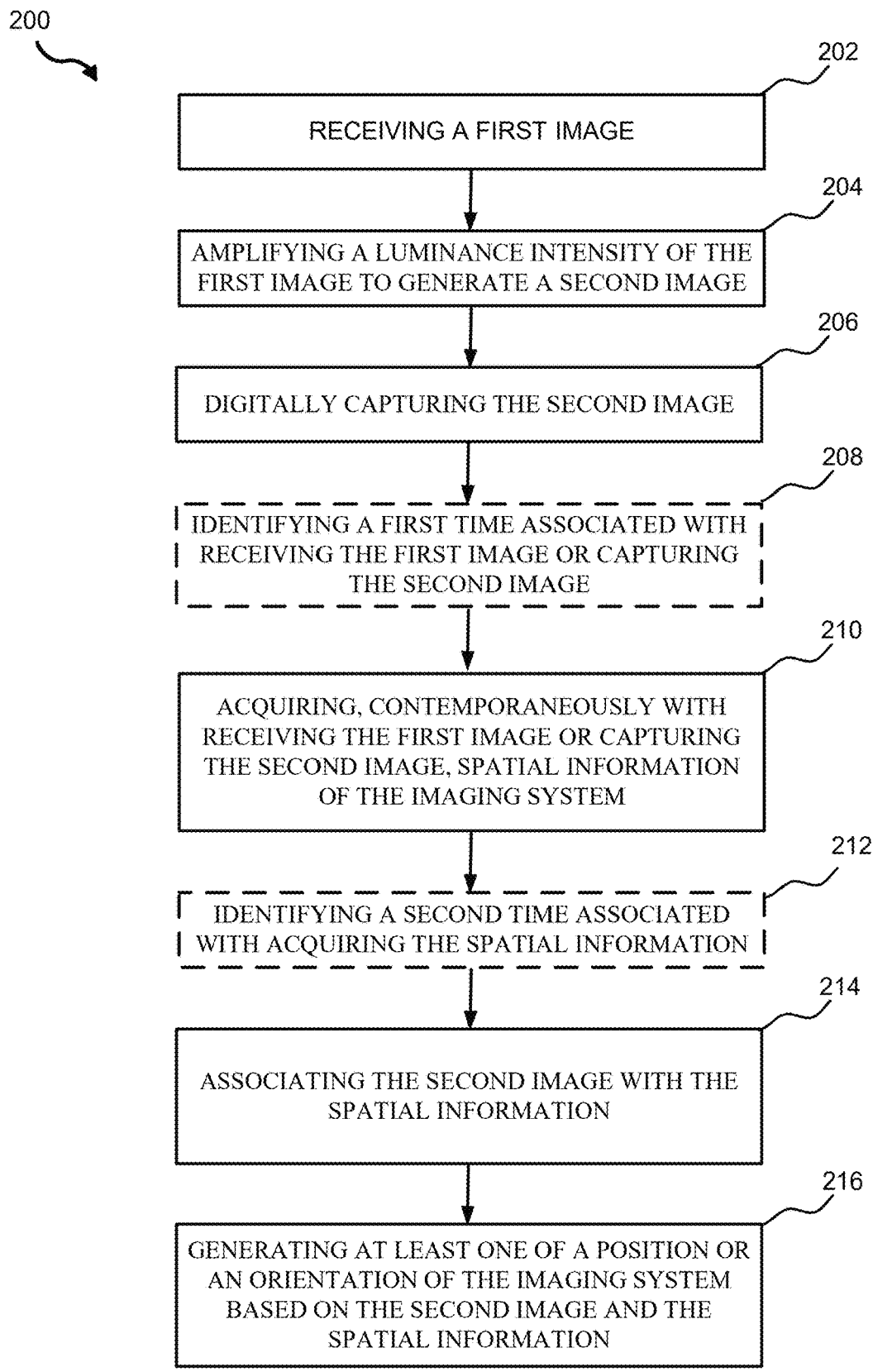
FIG. 2 illustrates an example a method for implementing intensified visual inertial odometry in accordance with aspects of the present disclosure.

Turning to FIG. 2, an example of a method 200 for generating intensified visual inertial odometry may be implemented by the imaging system 102, the imaging device 104, the computing device 106, the IMU 122, the multiplier 134, the image sensor 138, the memory 120, the processor 140, the communication component 142, the imaging component 144, the IMU component 146, and/or the algorithm component 148 of FIG. 1.

At block 202, the method 200 may receive a first image. For example, the multiplier 134 may receive the first image 110 (FIG. 1).

At block 204, the method 200 may amplify a luminous intensity of the first image to generate a second image. For example, as shown in FIG. 1, the multiplier 134 may amplify the luminous intensity of the first image 110 to generate the second image 112.

At block 206, the method 200 may digitally capture the second image. For example, as shown in FIG. 1, the image sensor 138 may digitally capture the second image 112.

At block 208, the method 200 may optionally identify a first time associated with receiving the first image or capturing the second image. For example, as shown in FIG. 1, the imaging component 144 may identify the first time associated with receiving the first image 110 or digitally capturing the second image 112.

At block 210, the method 200 may acquire, contemporaneously with receiving the first image or capturing the second image, spatial information of the imaging system. For example, as shown in FIG. 1, the IMU 122 may contemporaneously obtain the spatial information 114 of the imaging system 102 and/or the imaging device 104 with receiving the first image 110 or capturing the second image 112.

At bock 212, the method 200 may optionally identify a second time associated with acquiring the spatial information. For example, as shown in FIG. 1, the IMU component 146 may identify the second time associated with acquiring the spatial information 114.

At block 214, the method 200 may associate the second image with the spatial information. For example, as shown in FIG. 1, the algorithm component 148 may associate the second image 112 with the spatial information 114. In one optional implementation, the algorithm component 148 may associate the second image 112 with the spatial information 114 based on the first time being substantially contemporaneous with the second time (e.g., the first time and the second time are within 1 millisecond, 10 milliseconds, 30 milliseconds, 50 milliseconds, 100 milliseconds, 500 milliseconds, etc.).

At block 216, the method 200 may generate at least one of a position and/or an orientation of the imaging system based on the second image and the spatial information. For example, as shown in FIG. 1, the algorithm component 148 may generate at least one of the position and/or the orientation 116 of the imaging system 102 based on the second image 112 and the spatial information 114.

Figure 3:
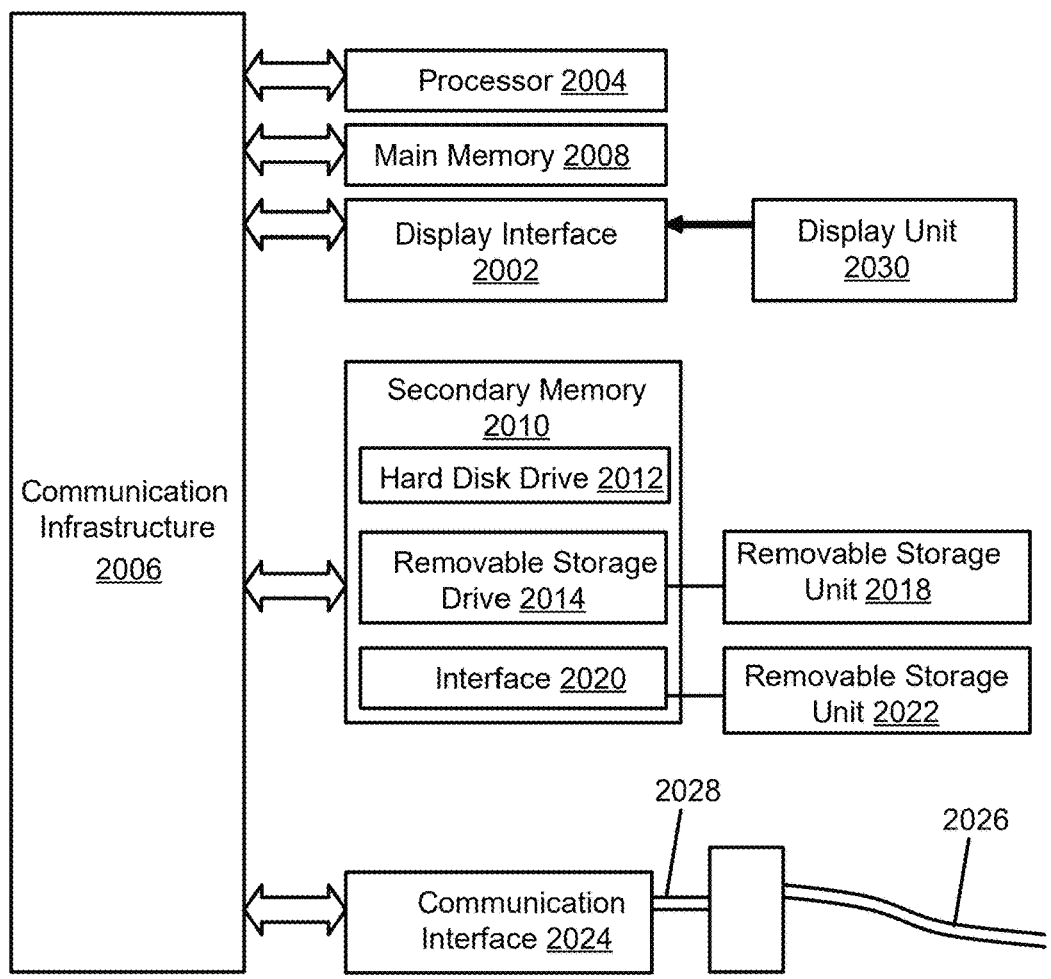
FIG. 3 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 3. In some examples, the imaging system 102, the imaging device 104, and/or the computing device 106 may be implemented as the computer system 2000 shown in FIG. 3. The imaging system 102, the imaging device 104, and/or the computing device 106 may include some or all of the components of the computer system 2000.

The computer system 2000 includes one or more processors, such as processor 2004. The processor 2004 is connected with a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data. In some examples, one or more of the main memory 2008, the secondary memory 2010, the removable storage unit 2018, and/or the removable storage unit 2022 may be a non-transitory memory.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and the removable storage unit 2022 and the interface 2020, which allow software and data to be transferred from the removable storage unit 2022 to computer system 2000.

Computer system 2000 may also include a communications interface 2024. The communications interface 2024 may allow software and data to be transferred between computer system 2000 and external devices. Examples of the communications interface 2024 may include a modem, a network interface (such as an Ethernet card), a communications port, a Personal Computer Memory Card International Association (PCMCIA) slot and card, etc. Software and data transferred via the communications interface 2024 are in the form of signals 2028, which may be electronic, electromagnetic, optical or other signals capable of being received by the communications interface 2024. These signals 2028 are provided to the communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as the removable storage unit 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard disk drive 2012, or the interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
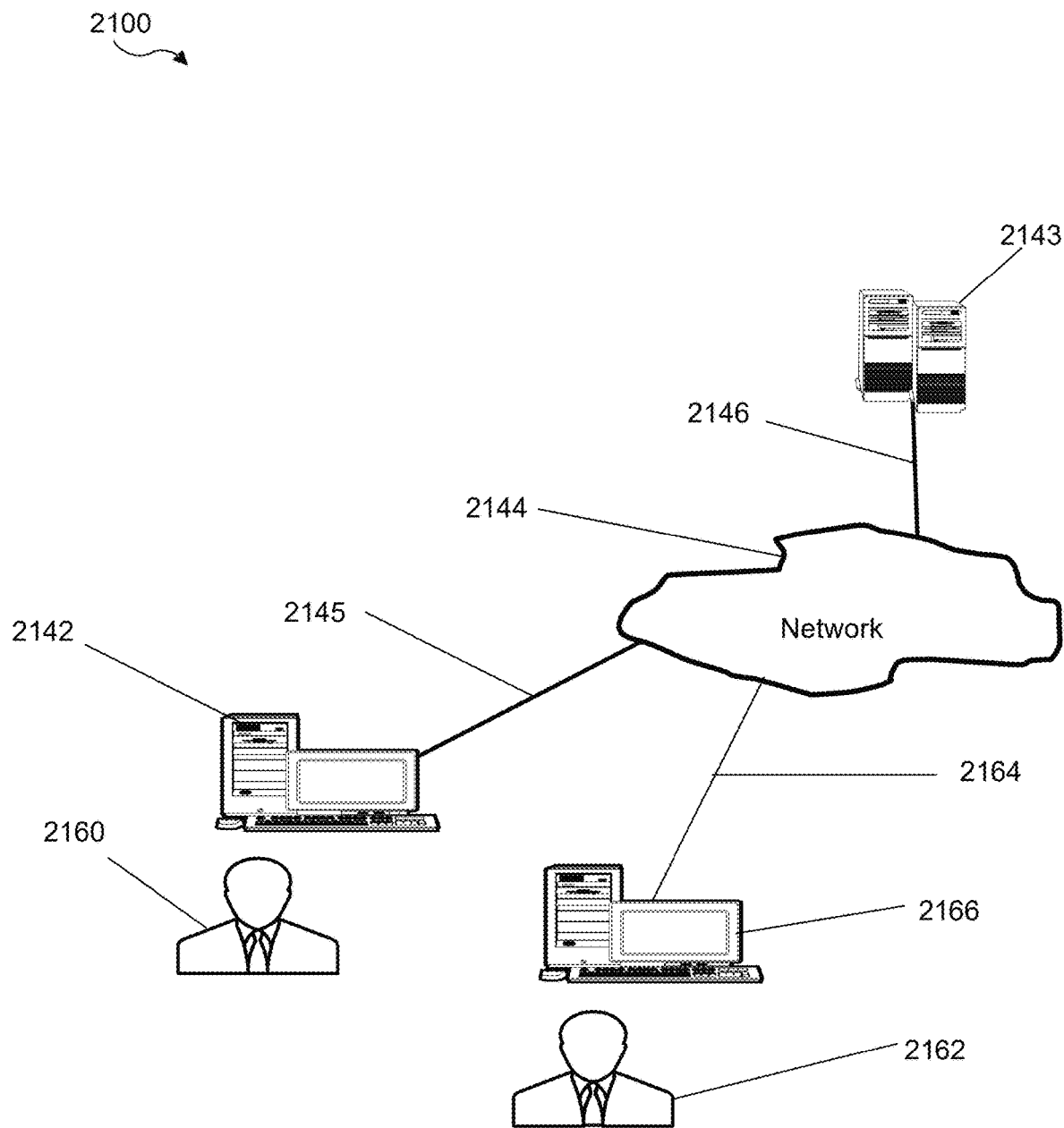
FIG. 4 illustrates a block diagram of various example system components in accordance with aspects of the present disclosure.

FIG. 4 is a block diagram of various example system components, in accordance with an aspect of the present disclosure. FIG. 4 shows a communication system 2100 usable in accordance with the present disclosure. The communication system 2100 includes one or more accessors 2160, 2162 (also referred to interchangeably herein as one or more "users") and one or more terminals 2142, 2166. In one aspect, data for use in accordance with aspects of the present disclosure is, for example, input and/or accessed by the one or more accessors 2160, 2162 via the one or more terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method implemented by an imaging system, comprising:
   receiving a first image;
   amplifying a luminous intensity of the first image to generate a second image;
   digitally capturing the second image;
   acquiring, contemporaneously with receiving the first image or capturing the second image, spatial information of the imaging system;
   associating the second image with the spatial information; and
   generating at least one of a position or an orientation of the imaging system based on the second image and the spatial information.

2. The method of claim 1, further comprising collimating light associated with the first image prior to amplifying the luminous intensity.

3. The method of claim 1, further comprising focusing the second image prior to digitally capturing the second image.

4. The method of claim 1, further comprising:
   identifying a first time associated with receiving the first image or capturing the second image;
   identifying a second time associated with acquiring the spatial information;
   appending a first time stamp indicating the first time to the first image or the second image;
   appending a second time stamp indicating the second time to the spatial information; and
   wherein associating the second image with the spatial information comprises associating the second image with the spatial information based on the first time being substantially contemporaneous with the second time.

5. The method of claim 1, further comprising determining 3-dimensional locations of points of an environment surrounding the imaging system.

6. The method of claim 1, wherein generating the at least one of the position or the orientation of the imaging system comprises generating using one or more of a simultaneous localization and mapping algorithm, a visual odometry algorithm, or a visual-inertial odometry algorithm.

7. The method of claim 1, wherein receiving the spatial information comprises measuring one or more of a linear velocity of the imaging system, an angular velocity of the imaging system, a linear acceleration of the imaging system, an angular acceleration of the imaging system, a magnetic field, or a magnetic dipole moment.

8. The method of claim 1, further comprising:
   receiving a third image associated with the first image;
   amplifying a second luminous intensity of the third image to generate a fourth image;
   digitally capturing the fourth image;
   acquiring, contemporaneously with receiving the third image or capturing the fourth image, additional spatial information of the imaging system, wherein the spatial information and the additional spatial information are identical or different; and
   associating the fourth image with the additional spatial information,
   wherein generating the at least one of the position or the orientation of the imaging system comprises generating based on the second image, the fourth image, the spatial information, and the additional spatial information.

9. The method of claim 1, further comprising:
   receiving a first plurality of images associated with the first image;
   amplifying a plurality of luminous intensity of the first plurality of images to generate a second plurality of images;
   digitally capturing the second plurality of images;
   acquiring, contemporaneously with receiving the first plurality of images or capturing the second plurality of images, additional spatial information of the imaging system, wherein the spatial information and the additional spatial information are identical or different; and
   associating the second plurality of images with the additional spatial information,
   wherein generating the at least one of the position or the orientation of the imaging system comprises generating based on the second image, the second plurality of images, the spatial information, and the additional spatial information.

10. An imaging system, comprising
    a multiplier configured to:
      receive a first image; and
      amplify a luminous intensity of the first image to generate a second image;
    an image sensor configured to digitally capture the second image;
    an inertial measurement unit configured to acquire, contemporaneously with receiving the first image or capturing the second image, spatial information of the imaging system;
    a memory that stores instructions; and
    a processor configured to execute the instructions to:
      associate the second image with the spatial information; and
      generate at least one of a position or an orientation of the imaging system based on the second image and the spatial information.

11. The imaging system of claim 10, further comprising a first optical filter configured to collimate light associated with the first image prior to amplifying the luminous intensity.

12. The imaging system of claim 11, further comprising a second optical filter configured to focus the second image prior to digitally capturing the second image.

13. The imaging system of claim 10, wherein the processor is further configured to:
    identify a first time associated with receiving the first image or capturing the second image;
    identify a second time associated with acquiring the spatial information;
    append a first time stamp indicating the first time to the first image or the second image;

append a second time stamp indicating the second time to the spatial information; and wherein associating the second image with the spatial information comprises associating the second image with the spatial information based on the first time being substantially contemporaneous with the second time.

14. The imaging system of claim 10, wherein the processor is further configured to determine 3-dimensional locations of points of an environment surrounding the imaging system.

15. The imaging system of claim 10, wherein the processor is further configured to generate the at least one of the position or the orientation of the imaging system using one or more of a simultaneous localization and mapping algorithm, a visual odometry algorithm, or a visual-inertial odometry algorithm.

16. The imaging system of claim 10, wherein the processor is further configured to receive the spatial information by measuring one or more of a linear velocity of the imaging system, an angular velocity of the imaging system, a linear acceleration of the imaging system, an angular acceleration of the imaging system, a magnetic field, or a magnetic dipole moment.

17. The imaging system of claim 10, wherein the processor is further configured to:
receive a third image associated with the first image;
amplify a second luminous intensity of the third image to generate a fourth image;
digitally capture the fourth image;
acquire, contemporaneously with receiving the third image or capturing the fourth image, additional spatial information of the imaging system, wherein the spatial information and the additional spatial information are identical or different; and
associate the fourth image with the additional spatial information,
wherein generating the at least one of the position or the orientation of the imaging system comprises generating based on the second image, the fourth image, the spatial information, and the spatial additional information.

18. The imaging system of claim 10, wherein the processor is further configured to:
receive a first plurality of images associated with the first image;
amplify a plurality of luminous intensity of the first plurality of images to generate a second plurality of images;
digitally capture the second plurality of images;
acquire, contemporaneously with receiving the first plurality of images or capturing the second plurality of images, additional spatial information of the imaging system, wherein the spatial information and the additional spatial information are identical or different; and
associate the second plurality of images with the additional spatial information,
wherein generating the at least one of the position or the orientation of the imaging system comprises generating based on the second image, the second plurality of images, the spatial information, and the additional spatial information.

19. The imaging system of claim 10, wherein the inertial measurement unit comprises at least one or more accelerometers, gyroscopes, and/or magnetometers.

20. The imaging system of claim 10, wherein the image sensor comprises a charged coupled device (CCD) sensor or a complimentary metal-oxide-semiconductor (CMOS) sensor.

21. The imaging system of claim 10, wherein the multiplier comprises an intensifier tube, a photocathode, a photomultiplier, an avalanche photodiode, or a quantum well diode.

22. A night vision helmet, comprising:
a first multiplier configured to:
receive a first image; and
amplify a first luminous intensity of the first image to generate a second image;
a first image sensor configured to digitally capture the second image;
a second multiplier configured to:
receive a third image contemporaneously with receiving the first image; and
amplify a second luminous intensity of the third image to generate a fourth image;
a second image sensor configured to digitally capture the fourth image;
an inertial measurement unit configured to acquire, contemporaneously with receiving the first image or capturing the second image, spatial information of the night vision helmet;
a memory that stores instructions;
a processor configured to execute the instructions to:
associate the second image and the fourth image with the spatial information; and
generate at least one of a position or an orientation of the night vision helmet based on the second image, the fourth image, and the spatial information;
a display configured to display at least one of the second image, the fourth image, or the at least one of the position or the orientation of the night vision helmet.

23. The night vision helmet of claim 22, further comprising:
a first optical filter configured to collimate light associated with the first image prior to amplifying the first luminous intensity; and
a second optical filter configured to collimate light associated with the third image prior to amplifying the second luminous intensity.

24. The night vision helmet of claim 23, further comprising:
a third optical filter configured to focus the second image prior to digitally capturing the second image; and
a fourth optical filter configured to focus the fourth image prior to digitally capturing the fourth image.

25. The night vision helmet of claim 22, wherein the processor is further configured to:
identify a first time associated with receiving the first image or capturing the second image;
identify a second time associated with receiving the third image or capturing the fourth image;
identify a third time associated with acquiring the spatial information;
append a first time stamp indicating the first time to at least one of the first image, the second image, the third image, or the fourth image;
append a second time stamp indicating the third time to the spatial information; and
wherein associating the second image and the fourth image with the spatial information comprises associating the second image and the fourth image with the spatial information based on the first time and the second time being substantially contemporaneous with the third time.

26. The night vision helmet of claim 22, wherein the processor is further configured to determine 3-dimensional locations of points of an environment surrounding the imaging system.

27. The night vision helmet of claim 22, wherein the processor is further configured to generate the at least one of the position or the orientation of the imaging system using one or more of a simultaneous localization and mapping algorithm, a visual odometry algorithm, or a visual-inertial odometry algorithm.

28. The night vision helmet of claim 22, wherein the processor is further configured to receive the spatial information by measuring one or more of a linear velocity of the imaging system, an angular velocity of the imaging system, a linear acceleration of the imaging system, an angular acceleration of the imaging system, a magnetic field, or a magnetic dipole moment.

29. The night vision helmet of claim 22, wherein the processor is further configured to:
receive a first plurality of images associated with the first image;
amplify a plurality of luminous intensity of the first plurality of images to generate a second plurality of images;
digitally capture the second plurality of images;
acquire, contemporaneously with receiving the first plurality of images or capturing the second plurality of images, additional spatial information of the night vision helmet, wherein the spatial information and the additional spatial information are identical or different; and
associate the second plurality of images with the additional spatial information,
wherein generating the at least one of the position or the orientation of the imaging system comprises generating based on the second image, the second plurality of images, the spatial information, and the additional spatial information.

30. The night vision helmet of claim 22, wherein the inertial measurement unit comprises at least one or more accelerometers, gyroscopes, and/or magnetometers.

31. The night vision helmet of claim 22, wherein the first image sensor or the second image sensor comprises a charged coupled device (CCD) sensor or a complimentary metal-oxide-semiconductor (CMOS) sensor.

32. The night vision helmet of claim 22, wherein the first multiplier or the second multiplier comprises an intensifier tube, a photocathode, a photomultiplier, an avalanche photodiode, or a quantum well diode.

* * * * *